No. 655,048. Patented July 31, 1900.
W. A. BREEDEN.
FERTILIZER DISTRIBUTER.
(Application filed June 8, 1900.)
(No Model.)
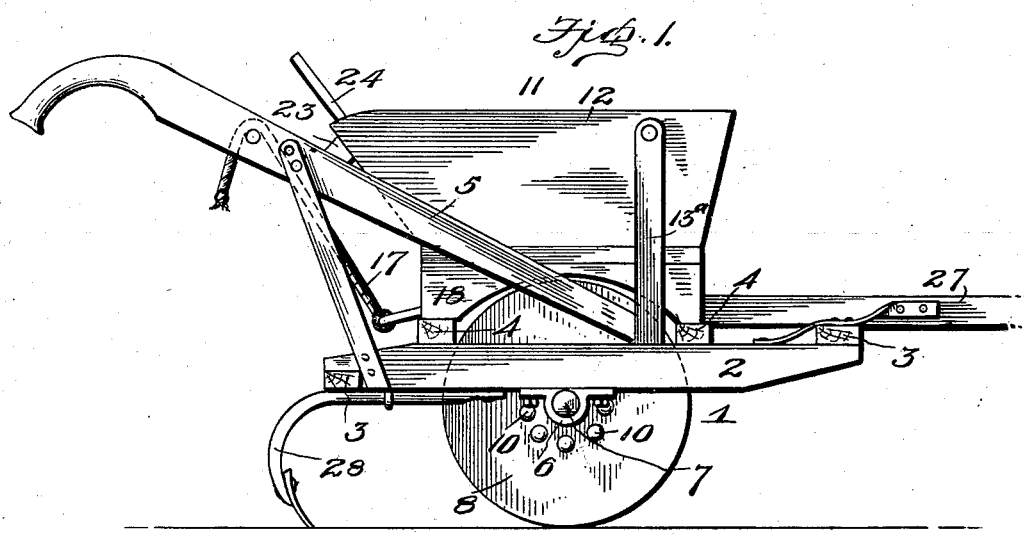
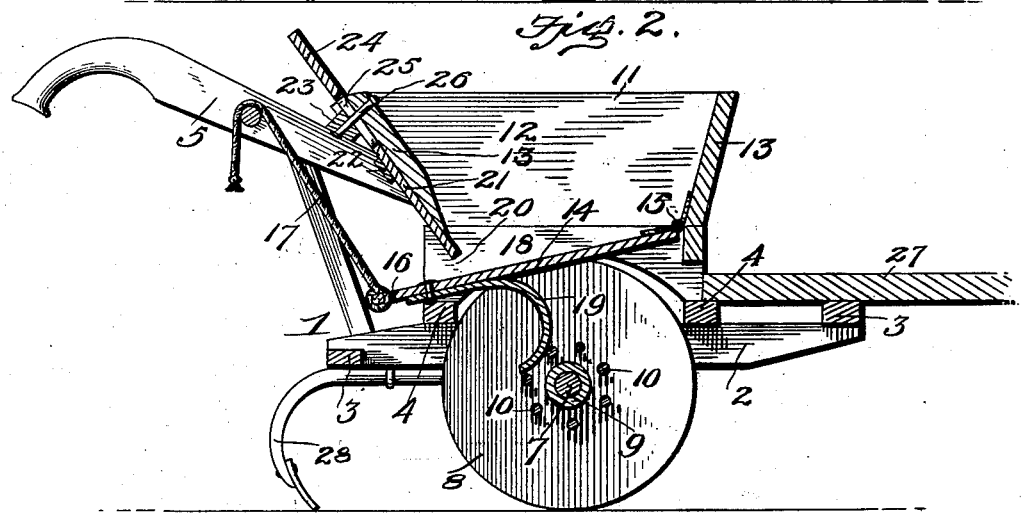
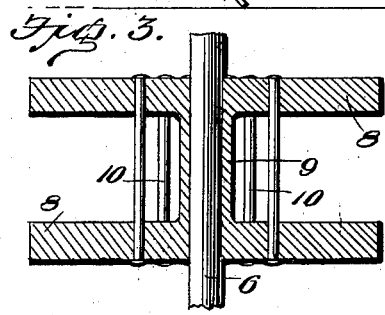
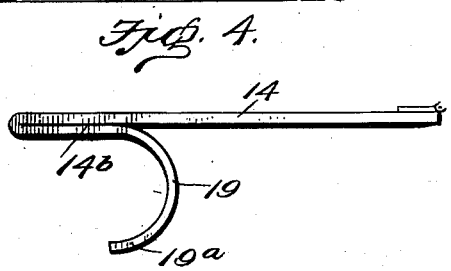
Witnesses
Inventor
Welcome A. Breeden,
by Benj. A. Cowl
Attorney
THE NORRIS PETERS CO., PHOTO-LITHO., WASHINGTON, D. C.

UNITED STATES PATENT OFFICE.

WELCOME ADAMS BREEDEN, OF McCOLL, SOUTH CAROLINA.

FERTILIZER-DISTRIBUTER.

SPECIFICATION forming part of Letters Patent No. 655,048, dated July 31, 1900.

Application filed June 8, 1900. Serial No. 19,606. (No model.)

*To all whom it may concern:*

Be it known that I, WELCOME ADAMS BREEDEN, a citizen of the United States, residing at McColl, in the county of Marlborough, State of South Carolina, have invented certain new and useful Improvements in Fertilizer-Distributers; and I do declare the following to be a full, clear, and exact description of the invention, such as will enable others skilled in the art to which it appertains to make and use the same.

My invention relates to improvements in fertilizer-distributers of that class in which a vibrating plate or bar forming the bottom of the hopper is actuated by tappet mechanism to feed the fertilizer from the hopper to the ground.

One object of the invention is to provide a fertilizer-distributer of this character which is simple in construction and effective in operation and in which the parts are combined and arranged in such manner as to secure a stable structure and obviate liability of derangement or injury to the feed mechanism by casual shocks or blows.

A further object of the invention is to mount the vibrating feeder-plate so as to secure a much more thorough and effective feed of the fertilizer than has heretofore been secured and to utilize the tappet mechanism to serve also as braces for the supporting-wheels.

With these and other minor objects in view the invention consists of certain novel features of construction, combination, and arrangement of parts, as will be hereinafter more fully described, and particularly pointed out in the appended claim.

In the accompanying drawings, Figure 1 is a side elevational view of a fertilizer-distributer embodying my invention. Fig. 2 is a central vertical longitudinal section of the same. Fig. 3 is a cross-sectional view of the supporting-wheels and connecting parts. Fig. 4 is a detail view of a modified form of vibrating feeder-plate.

Referring now more particularly to the drawings, in which like reference characters designate corresponding parts throughout the several views, the numeral 1 represents the frame of the distributer, which comprises the two longitudinal side bars 2, connected at front and rear by cross-bars 3 and immediately by other cross-bars 4, located upon opposite sides of the centers thereof, as shown. To the upper surfaces of the beams are secured the stilts or handles 5, and to the under surfaces thereof the bearings 6, in which the ends of the shaft 7, carrying the supporting-wheels 8, are mounted. These wheels are located on the interior of the frame and between the side beams and are mounted upon a hub 9, rigidly connected with said shaft. Extending around this hub is a series of tappet pins or bolts 10, which are securely connected to the wheels and serve to impart vibratory motion to the feeder-plate, hereinafter described, and also act as braces to hold the wheels firmly and securely connected and to reinforce the hub 9.

The hopper 11 is mounted upon the cross-bars 4 and is formed of the inclined side pieces 12 and end pieces 13 and stayed by standards or upright braces 13ª, extending upwardly from the frame and secured to said side pieces. The bottom of the hopper is formed by a vibrating feeder-plate 14, mounted at its forward end to move in a vertical plane upon a hinge or pivot 15, secured to the front wall of the hopper, and provided at its rear end with an opening 16 for the attachment of a cord, cable, or like connection 17 thereto, whereby it may be elevated and held fixed against the action of the tappet mechanism to prevent the discharge of the fertilizer contained within the hopper whenever desired. The feeder-plate inclines downwardly and rearwardly in the usual manner and is mounted to move between guards 18, secured to the end walls of the hopper and forming continuations of the side walls thereof, said guards serving to form a chamber in which the feeder-plate vibrates and to shield the same from injury by strains, shocks, or blows. The feeder-plate is provided at its rear end with a contact-piece consisting of a plate or strip of metal 19, having one end secured thereto and the other end curved downwardly and rearwardly and forming a resilient tongue, which normally rides upon the tappet-pins 10 and is alternately raised and lowered thereby, whereby up-and-down vibratory motion is imparted to the rear end of the feeder-plate, and thereby the fertilizer is shaken up and is fed rearwardly through the discharge-opening 20 at the rear end of the hopper and thence drops down on the ground. The object of curving the contact-piece in the manner shown and described to form a resilient tongue is to secure a much more thorough and effective vibratory action of the feeder-plate and at the same time to make provision for the absorption of any undue vibration of the tongue and forceful operation of the feeder-plate, which may occur when the supporting-wheels strike a stone or other obstruction.

The feed of the fertilizer from the hopper may be readily and conveniently regulated through the medium of a valve or slide-gate 21, mounted to slide vertically between the rear wall of the hopper and cross-bars 22 and 23, applied, respectively, to the projecting rear ends of the side walls of the hopper and to the stilts or handles 5. The upper end of the valve or slide-gate is formed into a handle 24, which is located so as to be conveniently grasped by the operator, and the lower end of this handle is slotted, as at 25, and a pin 26 is passed through this slot and fixed in the bar 23 and rear wall of the hopper and serves to guide the valve in its movement. By raising and lowering the valve the size of the discharge-opening may be increased or diminished, as desired, and the feed of the fertilizer thus regulated.

The mechanism for forming the furrow to receive the seed is not herein shown, as it forms no part of my present invention.

A tongue or pole 27 is attached to the front end of the frame for the attachment thereto of the draft-animals, and plow-shovels 28 are arranged at the rear of the fertilizer for covering the same in the usual manner.

The operation of my improved fertilizer-distributer will be readily understood from the foregoing description, taken in connection with the accompanying drawings. The fertilizing material which is to be distributed is placed in the hopper, the draft-animals attached, and the machine then dragged over the field in the usual manner. As the machine is dragged along the spring-tongue or contact-piece carried by the vibratory feed-plate is alternately raised and lowered by the tappet-pins on the supporting-wheels, and the feed-plate is thus rapidly moved up and down, causing the fertilizer to loosen up and discharge at the rear of the machine, the fertilizer being distributed and covered up by the following plow-shovels. The amount of fertilizer discharged may be conveniently regulated by simply raising or lowering the valve and the feed of fertilizer stopped at any time by elevating the rear end of the feeder-plate and holding it against the lower end of the rear wall of the hopper through the medium of the operating-cord, as will be readily understood.

Instead of making the tongue 19 independent of the feeder-plate and attaching it thereto I may form it integral with said plate, as shown in Fig. 4, in which the rear end of the feeder-plate 14 is shown doubled upon itself and extended forwardly, as at $14^b$, and thus curved downwardly and rearwardly to form the resilient tongue $19^a$.

Changes in the form, proportion, and minor details of construction may be made within the scope of the invention without departing from the spirit or sacrificing any of the advantages thereof.

Having thus described my invention, what I claim, and desire to secure by Letters Patent, is—

In a fertilizer-distributer of the character set forth, the combination, with a frame, of a hopper mounted thereon and having a discharge-opening at its rear, side guards depending from and forming continuations of the side walls of the hopper, a vibrating feeder-plate hinged or pivoted at its forward end to the hopper and arranged to move between said side guards, supporting-wheels carrying tappet devices, a downwardly and rearwardly curved contact-piece upon the free end of the feeder-plate to engage said tappet devices, means for elevating the feeder-plate to close the bottom of the hopper, and a vertically-movable valve or gate at the rear of the hopper and coöperating with the feeder-plate to control the discharge of fertilizer therefrom, substantially as described.

In testimony whereof I have hereunto set my hand in presence of two subscribing witnesses.

WELCOME ADAMS BREEDEN.

Witnesses:
R. K. BREEDEN,
JAMES BREEDEN.